United States Patent
Hikmet et al.

(10) Patent No.: US 10,449,716 B2
(45) Date of Patent: Oct. 22, 2019

(54) 3D PRINTED LUMINAIRES USING OPTICAL FIBERS

(71) Applicant: SIGNIFY HOLDING B.V., Eindhoven (NL)

(72) Inventors: Rifat Ata Mustafa Hikmet, Eindhoven (NL); Paulus Albertus Van Hal, Eindhoven (NL); Ties Van Bommel, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/898,253

(22) Filed: Feb. 16, 2018

(65) Prior Publication Data
US 2018/0236712 A1 Aug. 23, 2018

(30) Foreign Application Priority Data
Feb. 21, 2017 (EP) ..................................... 17157071

(51) Int. Cl.
| | |
|---|---|
| F21V 7/04 | (2006.01) |
| B29C 64/165 | (2017.01) |
| B33Y 80/00 | (2015.01) |
| B33Y 10/00 | (2015.01) |
| B29C 64/118 | (2017.01) |

(Continued)

(52) U.S. Cl.
CPC .......... *B29C 64/165* (2017.08); *B29C 64/118* (2017.08); *B29C 64/30* (2017.08); *B33Y 10/00* (2014.12); *B33Y 30/00* (2014.12); *B33Y 40/00* (2014.12); *B33Y 80/00* (2014.12); *G02B 6/001* (2013.01); *B29C 64/209* (2017.08);

(Continued)

(58) Field of Classification Search
CPC ... B29C 64/118; B29C 64/165; B29C 64/209; B29C 64/30; B29K 2309/08; B29L 2011/00; B33Y 10/00; B33Y 30/00; B33Y 40/00; B33Y 80/00; G02B 6/0003; G02B 6/001
USPC ......................................................... 362/556
See application file for complete search history.

(56) References Cited

U.S. PATENT DOCUMENTS

| | | |
|---|---|---|
| 2010/0092143 A1 | 5/2010 | Ushiwata et al. |
| 2014/0061974 A1 | 3/2014 | Tyler |

(Continued)

FOREIGN PATENT DOCUMENTS

| | | |
|---|---|---|
| WO | WO2015077262 A1 | 5/2015 |

OTHER PUBLICATIONS

CRC Press, "Handbook of Chemistry and Physics", 69th Edition, 1988-1989, pp. E208, E406.

*Primary Examiner* — Thien M Le
(74) *Attorney, Agent, or Firm* — Meenakshy Chakravorty (57) ABSTRACT

The invention provides a method comprising 3D printing a 3D item, the method comprising depositing during a printing stage 3D printable material and an optical fiber, to provide the 3D item with the optical fiber at least partly embedded in 3D printed material, wherein the 3D printable material during at least part of the printing stage comprises a light transmissive material, the method further comprising providing during the printing stage a light escape part comprising 3D printed material comprising the light transmissive material, where visible light propagating through the optical fiber can escape from the optical fiber via the 3D printed material comprised by the light escape part to external of the 3D item.

14 Claims, 4 Drawing Sheets

(51) Int. Cl.
*B33Y 30/00* (2015.01)
*B33Y 40/00* (2015.01)
*B29C 64/30* (2017.01)
*F21V 8/00* (2006.01)
B29C 64/209 (2017.01)
B29K 309/08 (2006.01)
B29L 11/00 (2006.01)

(52) U.S. Cl.
CPC ....... *B29K 2309/08* (2013.01); *B29L 2011/00* (2013.01); *G02B 6/0003* (2013.01)

(56) References Cited

U.S. PATENT DOCUMENTS

| | | |
|---|---|---|
| 2014/0291886 A1 | 10/2014 | Mark et al. |
| 2015/0078712 A1 | 3/2015 | Brunner et al. |
| 2016/0200047 A1 | 7/2016 | Mark et al. |
| 2016/0311165 A1* | 10/2016 | Mark ................... B33Y 10/00 |
| 2016/0334582 A1* | 11/2016 | Eikenberry ............. G02B 6/06 |
| 2018/0036946 A1* | 2/2018 | Barton .................. B33Y 10/00 |
| 2018/0096672 A1* | 4/2018 | Taylor .................... G10D 3/00 |
| 2018/0141274 A1* | 5/2018 | Fink ...................... B33Y 10/00 |
| 2018/0214951 A1* | 8/2018 | Koponen ........... B23K 26/0732 |
| 2018/0229429 A1* | 8/2018 | Tyler .................... B29C 70/207 |
| 2018/0304094 A1* | 10/2018 | Hicks .................. A61N 5/0616 |
| 2018/0321325 A1* | 11/2018 | Fortier |

\* cited by examiner

3D PRINTED LUMINAIRES USING OPTICAL FIBERS

FIELD OF THE INVENTION

The invention relates to a method for manufacturing a 3D (printed) item. The invention also relates to the 3D (printed) item obtainable with such method. Further, the invention relates to a lighting system including such 3D (printed) item. Yet further, the invention also relates to a 3D printer.

BACKGROUND OF THE INVENTION

The use of optical fibers in 3D printing technology is known in the art. WO2015/077262, for instance, describes 3D printer inputs including filaments comprising separated layers or sections. These inputs particularly including filaments may be prepared by coextrusion, microlayer coextrusion or multicomponent/fractal coextrusion. These inputs, and specifically filaments, are alleged to enable layering or combining different materials simultaneously through one or more nozzles during the so-called 3D printing process. These techniques facilitate smaller layer sizes (milli, micro, and nano) different layer configurations as well as the potential to incorporate materials that would otherwise not be usable in standard 3D printer methods. Amongst others, this document describes a substrate reinforced 3D filament where the substrate(s) is coiled braided, weaved, folded, stacked, etc. in such a way that when printed, the substrate will release with the length of the printed material. Substrates could include but are not limited to carbon fibers, optical fibers, Kevlar fibers and wires. Multiple substrates could be incorporated in the filament. It is necessary to stack weave or coil the fibers if the printed path is longer than the length of filament extruded to print that path.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerisable material which is cured after each deposition to form a solid structure. While this technique produces smooth surfaces the photo curable materials are not very stable and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast and can be used for printing complicated object.

FDM printers are relatively fast, low cost and can be used for printing complicated 3D objects. Such printers are used in printing various shapes using various polymers. The technique is also being further developed in the production of LED luminaries and lighting solutions.

The use of 3D printed objects as lighting devices is not straightforward as in general the optical components are not easily printable or are not printable at all (with a sufficient quality). Hence, alternative routes may have to be designed to obtain 3D printed devices that may also have a lighting function. Hence, it is an aspect of the invention to provide an alternative 3D printing method and/or 3D (printed) item which preferably further at least partly obviate(s) one or more of above-described drawbacks. The present invention may have as object to overcome or ameliorate at least one of the disadvantages of the prior art, or to provide a useful alternative. Optical fibers are interesting for producing decorative illumination. By using an optical fiber one can easily couple light from a solid-state light source, such as a laser or a LED, into a fiber and couple light out along the length of the fiber. It is desired to produce customized light emitting objects in a cost-effective way. In addition, it is desired that the light is emitted in a desired pattern from the object for signage or decorative illumination purposes.

Hence, in a first aspect the invention provides a method comprising 3D printing a 3D item (which may also be indicated as "item" or "3D printed item")(especially with a fused deposition modelling method), the method comprising depositing during a printing stage 3D printable material and an optical fiber ("fiber"), to provide the 3D item with the optical fiber at least partly embedded in 3D printed material, wherein the 3D printable material during at least part of the printing stage in specific embodiments comprises a light transmissive material, the method further comprising providing during the printing stage a light escape part comprising 3D printed material comprising the light transmissive material, where one or more of UV radiation, visible light and IR radiation, especially at least visible light, propagating through the optical fiber can escape from the optical fiber, especially via the 3D printed material comprised by the light escape part to external of the 3D item.

With such method, it is possible to provide a 3D printed device that allows lighting spots or lighting areas at predefined positions of the 3D printed item where the dimensions and positions of the lighting spots or lighting areas may be chosen with a relative large freedom of choice, e.g. for decorative light or functional lighting, for providing signs, etc. It may also be that essentially the entire 3D printed item may be light emitting, due to the fact that the invention allows a good distribution of the light in the 3D printed item. With the present invention, it is possible to provide 3D printed luminaries (also) using optical fibers.

As indicated above, the invention provides a method comprising 3D printing a 3D item. The method of the invention may (thus) also include other actions, such as post processing, addition other features to the 3D printed item, such as (other) optics, electronics, a light source, etc. Hence, in embodiments the method may further comprise a post-processing stage, wherein one or more parts of the 3D printed item may e.g. be heated, subjected to a solvent, etc. This post-processing may be executed to the ready 3D printed item and/or may be executed to those parts of the 3D printed item that are ready, but while the printing stage is not yet completed. Post-processing may e.g. be used to smoothen a surface of the 3D printed item. Yet further, in embodiments the method may further comprise functionally coupling the optical fiber with a light source configured to produce one or more of UV radiation, visible light and IR radiation, especially at least visible light. Instead of the term "in optical contact" also the term "radationally coupled" may be used. The term "radiationally coupled" and similar terms may especially mean(s) that two items are associated with each other so that at least part of the radiation provided by one of the items may further propagate through at least part of the other item. Of course, more than two items may be optically coupled. The phrase "functionally coupling the optical fiber with a light source" especially indicates configuring the light source and optical fiber such that light from the light (during use of the light source) source enters the optical fiber and propagates therethrough. Hence, I this context the light source can also be indicated as being optically coupled to the optical fiber.

The optical fiber or optical fibre is especially a flexible, transparent fiber e.g. made by drawing glass (silica) or plastic. Hence, in embodiments the optical fiber comprises a glass material. In general, the fiber has a core diameter selected from the range of 20-1000 μm, especially, 50-400 μm, such as 50-200 μm. With relative small diameters, the fiber may be flexible and bendable. The fiber may comprise a core and a cladding, though in embodiments the fiber may only include a core. In some embodiments, part of the fiber embedded by the 3D printed material has no cladding; in yet other embodiments essentially the entire embedded fiber has no cladding. The cladding may have an index of refraction smaller than of the core, such as at least 5% smaller, like at least 10% smaller.

The optical fiber may be optically coupled to a light source. The light source may be configured external of the 3D item or may be at least partly embedded in the 3D item. Hence, a light source may in embodiments be comprised by the 3D item. Therefore, in yet a further aspect the invention also provides a lighting system comprising (a) a light source configured to provide visible light source light and (b) the 3D item as defined herein, wherein the optical fiber is functionally coupled to the light source.

The optical fiber may also be optically coupled to a plurality of light sources. Further, the term "optical fiber" may also refer to a plurality of optical fibers, which may in embodiments not be optically coupled and of which two or more may in other embodiments be optically coupled. Hence, the 3D item may comprise in embodiments a plurality of fibers, which may in further embodiments be optically coupled to one or more light sources.

The term "light source" may refer to a semiconductor light-emitting device, such as a Laser, a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of light sources, such as 2-2000 solid state light sources.

The light source may be configured to generate UV radiation, visible radiation and/or IR radiation. Especially, the light source is configured to generated visible radiation, which may be colored light or white light.

As indicated above, the method comprises depositing during a printing stage 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed.

Herein, the term "3D printable material" may also be indicated as "printable material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the 3D printable material above the glass transition and if it is a semi-crystalline polymer above the melting temperature. In yet another embodiment, the 3D printable material comprises a (thermoplastic) polymer having a melting point ($T_m$), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former.

As indicated above, the invention thus provides a method comprising providing a filament of 3D printable material and printing during a printing stage said 3D printable material on a substrate, to provide said 3D item. Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polystyrene (PS), PE (such as expanded-high impact-Polythene (or polyethene), Low density (LDPE) High density (HDPE)), PVC (polyvinyl chloride) Polychloroethene, etc. Optionally, the 3D printable material comprises a 3D printable material selected from the group consisting of Urea formaldehyde, Polyester resin, Epoxy resin, Melamine formaldehyde, Polycarbonate (PC), rubber, etc. Optionally, the 3D printable material comprises a 3D printable material selected from the group consisting of a polysulfone, a polyether sulfone, a polyphenyl sulfone, an imide (such as a poly ether imide) etc.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby. See further also below were specific (separate) substrates are discussed.

As indicated above, the method comprises depositing during a printing stage 3D printable material and an optical fiber. The 3D material is printed, such as with conventional 3D printing techniques, especially FDM. The optical fiber may be deposited with a device different from the printer head. Hence, the printing stage may include printing 3D printable material and deposition the optical fiber. However, in other embodiments during the printing stage the optical fiber and the 3D printable material are simultaneously deposited with a single printer head.

Hence, in specific embodiments the 3D printable material at least partly encloses the optical fiber. In these ways, the 3D item with the optical fiber at least partly embedded in 3D printed material may be provided. In general, the term "at least partly embedded" may refer to embodiments wherein the fiber is embedded in the 3D printed material but part thereof may protrude, e.g. for incoupling of light. Hence, especially over a certain length of the optical fiber, the optical fiber is fully embedded in the 3D printed material.

In specific embodiments, one or more parts of the fiber may not be covered by the 3D printed material. In such embodiments, over a part of the length of the optical fiber, the optical fiber may not be covered by the 3D printed material, and light may escape directly to external of the 3D printed item, without transmission through (light transmissive) 3D printed material. In such embodiments, the fiber may especially comprise a cladding, and may further comprise a bending and/or an outcoupling feature.

The phrase "depositing the optical fiber" and similar phrases may refer to embodiments wherein in the final product the optical fiber is completely embedded in the 3D item, and the optical fiber does not extend from the 3D printed item, or to embodiments wherein the optical fiber is embedded in the 3D printed item over a certain length of the optical fiber (such as at least 1 cm), but part of the optical fiber may extend from the 3D printed item.

To allow efficient transfer of light of the optical fiber to the external of the 3D printed item, at least part of the 3D printed material has to be light transmissive. Hence, the 3D printable material during at least part of the printing stage comprises a light transmissive material. In specific embodiments, the 3D printable material (and thus 3D printed material) comprises one or more of acrylonitrile butadiene styrene (ABS), polyphenyl sulfone (PPSF), polylactic acid (PLA), polycarbonate (PC), polyamide (PA), polystyrene (PS), polyethylene terephthalate (PET), polymethylmethacrylate (PMMA), etc. Hence, the light transmissive material comprises polymeric material.

The term "light transmissive" may also refer to transmissiveness for specific wavelengths. Hence, the light transmissive material may e.g. also be colored. In yet further embodiments, the light transmissive material may show light scattering (thus thereby making the light diffuse).

The transmission or light permeability can be determined by providing light at a specific wavelength with a first intensity to the material and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989).

In specific embodiments, a material may be considered transmissive when the transmission of the radiation at a wavelength or in a wavelength range, especially at a wavelength or in a wavelength range of radiation generated by a source of radiation as herein described, through a 1 mm thick layer of the material, especially even through a 5 mm thick layer of the material, under perpendicular irradiation with the radiation is at least about 20%, such as at least 40%, like at least 60%, such as especially at least 80%, such as at least about 85%, such as even at least about 90%.

Not all 3D printed material has to be light transmissive. There may be one or more parts of the 3D printed material be light transmissive and optionally one or more other parts may not be light transmissive (i.e. light impermeable).

To provide light via the fiber to the external of the 3D printed item, not only at least part of the 3D printed material may have to be light transmissive (or the optical fiber is partly not embedded), also at least part of the light should escape from the optical fiber, followed by propagation through the light transmissive material.

Hence, the method further comprising providing during the printing stage a light escape part comprising 3D printed material comprising the light transmissive material, where one or more of UV radiation, visible light and IR radiation, especially at least visible light, propagating through the optical fiber can escape from the optical fiber via the 3D printed material comprised by the light escape part to external of the 3D item. Several options can be chosen to facilitate escape from at least part of the light propagating through the optical fiber out of the optical fiber. The term "light escape part" especially refers to part of the 3D item where light escapes from the 3D item, due to a (local) outcoupling of light from the optical fiber, propagation of the light through the light transmissive material, and subsequent escape to the external form the 3D item.

The entire 3D item may be light transmissive and the optical fiber may be configured such that the entire 3D item may be light emitting (when the optical fiber is optically coupled to a light source). However, in yet other embodiments, the 3D item may comprise one or more light escape parts and one or more light impermeable parts. The term "light impermeable part" refers to a part of the 3D printed material that is essentially non-transmissive for light would it escape from the optical fiber. Such part may be created by choosing parameters like one or more of the thickness of the 3D printed material (between optical fiber and external of the 3D item), the type of 3D printed material (between optical fiber and external of the 3D item), one or more additives in the 3D printed material (between optical fiber and external of the 3D item), etc. In specific embodiments, the 3D item comprises at least two light escape parts, even more especially at least five light escape parts. The light escape part(s) may e.g. contribute to at least 10%, such as at least 20%, like up to 100% of the 3D item (especially referring to the 3D printed material and optical fiber).

In embodiments, during the printing stage the light escape part is further provided by configuring the optical fiber with a bending angle (a) that facilitates light escape from the optical fiber. Hence, the method may (thus) comprise depositing the optical fiber with a curvature which promotes outcoupling of visible light at the curvature, wherein the curvature of the optical fiber in the 3D printed material is comprised by the light escape part. With optical fibers having a diameter, including optional cladding, of equal to or less than about 400 μm, curvatures can be made that reduce locally total internal reflection. Especially, the angle α defines an arc, with a being at least 45°, especially in the range of 45°-135°, and with the concomitant radius of the arc being at maximum about 1 cm. In embodiments, the optical fiber may be provided with a bending having a bending radius which is especially at maximum 20 times the diameter, such as at maximum 15 times the diameter of the optical fiber, like especially at maximum 10 times the diameter of the optical fiber, such as at maximum 5 times the diameter of the optical fiber.

Hence, the radius is chosen such that total internal reflection is reduced and at least part of the light escapes from the optical fiber. Hence, over at least part of the length of the optical fiber, the optical fiber may have a bending radius of at maximum 10 times the diameter of the optical fiber.

Alternatively or additionally, during the printing stage the light escape part is further provided by providing an outcoupling feature to the optical fiber for facilitating light escape from the optical fiber via the outcoupling feature. The outcoupling feature may e.g. be the removal of part of the cladding (when available), such that the core is in direct contact with the 3D printable material. For instance, the optical fiber may be fed to the printer head and upstream thereof a device removes at least part of the cladding. Alternatively or additionally, a defect may be created in the optical fiber, such as a scratch in the optical fiber or a (non-through) cavity in the optical fiber. When a cladding is available, the defect may be in both the cladding and the underlying core. When no cladding is available (over part of the length of the optical fiber), only the core may comprise such defect. For instance, the optical fiber may be fed to the printer head and upstream thereof a device creates a defect in the optical fiber. Therefore, in embodiments providing an outcoupling feature may comprises one or more of (i) removing part of a cladding and (ii) creating a defect in the optical fiber.

Additionally or alternatively, the outcoupling feature may be provided to the optical fiber before the printing process. Hence, in embodiments the optical fiber may already include a defect and/or may over at least part of its length not comprise a cladding. However, in yet other embodiments, the defect is created during the 3D printing method or with the 3D printer.

As indicated above, the cladding may have in general an index of refraction lower than the core. This facilitates total internal reflection in the optical fiber. By choosing light transmissive material having an index of refraction larger than the optical fiber, outcoupling may be facilitate, especially when no cladding is available (over part of the length of the optical fiber). Hence, in embodiments the light transmissive material comprised by the light escape part has an index of refraction higher than an index of refraction of the optical fiber (wherein at least part of the optical fiber in contact with the light transmissive material does not comprise a cladding). The light transmissive material may have an index of refraction larger than of the core, such as at least 5% larger, like at least 20% larger.

The 3D printing method allows also tuning the optical properties of the light transmissive material, or more in general the 3D printable material. By controlling the composition of the 3D printable material, such as the composition of the polymeric material and or the concentration and/or type of additives, one or more parts of the 3D printed material may be light transmissive, may be light transmissive, may be essentially not light transmissive, may be luminescent, etc. etc. Hence, in embodiments the method may further comprise changing the composition of the 3D printable material during the printing stage by changing one or more of (i) a concentration of light reflective particles comprised by the 3D printable material, (ii) a concentration of a luminescent material comprised by the 3D printable material, (iii) an index of refraction of the 3D printable material, and (iv) a composition of the polymeric material comprised by the 3D printable material, for providing different parts of the 3D item, with at least the light escape part. The phrase "with at least the light escape part" is added to indicate that whatever choices are made, there is at least a single light escape part (see also above).

The term "reflective particles" may also refer to different type of reflective particles. The reflective particles may especially be reflective for the light of the light source which is optically coupled with the fiber of for which the optical fiber may be desired. Different parts may comprise different concentrations of reflective particles, including parts without reflective particles at all. Reflective particles may especially include one or more inorganic materials such as $TiO_2$, $Al_2O_3$, $MgO$, $Ba_2SO_4$, etc. etc., which are reflective materials known in the art.

The term "luminescent material" may also refer to different type luminescent materials. The luminescent material may especially be luminescent when absorbing the light of the light source which is optically coupled with the fiber of for which the optical fiber may be desired. Different parts may comprise different concentrations of luminescent materials, including parts without luminescent materials at all. The luminescent material(s) may especially include one or more inorganic luminescent materials, such as quantum structures or luminescent materials such as trivalent cerium comprising garnets, divalent europium comprising oxides or nitrides or oxynitrides, etc., organic luminescent materials, such as dyes, etc. etc.

Therefore, in specific embodiments the light transmissive material has a first transmission, wherein during a part of the printing stage the 3D printable material comprises a second material having a second transmission lower than the first transmission, and wherein the method further comprises providing one or more light escape parts and one or more parts that are not light transmissive and where no visible light can escape to the external via the 3D printed material, wherein the one or more parts comprise the second material. The second transmission may especially be at least 50% lower than the first transmission, such as at least 80%, like at least 90%, such as at least 95%.

Further, the invention relates to a software product that can be used to execute the method described herein.

The herein described method provides 3D printed items. Hence, the invention also provides in a further aspect a 3D printed item obtainable with the herein described method. Especially, the invention provides a 3D item comprising 3D printed material and an optical fiber, wherein the optical fiber is at least partly embedded in the 3D printed material, wherein the 3D item comprises a light escape part comprising the 3D printed material comprising a light transmissive material having a first transmission, where one or more of UV radiation, visible light and IR radiation, especially visible radiation, propagating through the optical fiber can escape from the optical fiber via the 3D printed material comprised by the light escape part to external of the 3D item.

Some specific embodiments in relation to the 3D printed item have already been elucidated below when discussing the method. Below, some specific embodiments in relation to the 3D printed item are discussed in more detail.

Hence, in specific embodiment one or more of (i) the optical fiber within the light escape part has a bending angle and/or radius (a) that facilitates light escape from the optical fiber, (ii) the optical fiber within the light escape part has an outcoupling feature for facilitating light escape from the optical fiber via the outcoupling feature, and (iii) the light transmissive material comprised by the light escape part has an index of refraction higher than an index of refraction of the optical fiber.

The bending radius is especially at maximum 20 times the diameter, such as at maximum 15 times the diameter of the optical fiber, like especially at maximum 10 times the diameter of the optical fiber, such as at maximum 5 times the diameter of the optical fiber.

Especially, in further embodiments the angle α defines an arc, with a being at least 45°, such as in the range of 45°-135°, and with the concomitant radius of the arc being at maximum about 1 cm.

In further embodiments, one or more of (i) the optical fiber comprises a core comprising a glass material and a cladding, wherein at least part of the core is not covered by the cladding wherein the part is at least partly comprised by the light escape part, and (ii) the optical fiber comprises an outcoupling feature comprising a defect for facilitating outcoupling of visible light from the optical fiber, wherein at least part of the outcoupling feature is comprised by the light escape part. In this way, outcoupling from the optical fiber of one or more of UV, visible, and IR radiation, especially visible, when provided to the optical fiber with a light source functionally coupled to the fiber, may (further) be facilitated.

As indicated above, there may be different parts comprised by the 3D item. Hence, in embodiments the 3D item comprises one or more light escape parts and one or more other parts that are not light transmissive, wherein two or more parts differ in one or more of (i) a concentration of light reflective particles comprised by the 3D printed material, (ii) a concentration of luminescent material comprised by the 3D printed material, (iii) an index of refraction of the 3D printed material, and (iv) a composition of the polymeric material comprised by the 3D printed material. Note that light impermeable parts may (also) be provided by providing light transmissive material with a high concentration of one or more of light reflective particles and a luminescent material. Hence, the invention also provides embodiments of the 3D item comprising one or more light escape parts, and one or more parts that are not light transmissive and where no visible light can escape to the external via the 3D printed material.

Returning to the 3D printing process, a specific 3D printer may be used to provide the 3D printed item described herein. Therefore, in yet a further aspect the invention also provides a fused deposition modeling 3D printer, comprising (a) a printer head comprising a printer nozzle, and (b) a 3D printable material providing device configured to provide 3D printable material to the printer head, wherein the fused deposition modeling 3D printer is configured to provide said 3D printable material and an optical fiber to a substrate, and wherein the fused deposition modeling 3D printer further comprises (c) a fiber optics modifier configured to modify the optical fiber by one or more of (i) removing a part of a cladding and (ii) creating a defect in the optical fiber. The 3D printable material providing device may provide a filament comprising 3D printable material to the printer head or may provide the 3D printable material as such, with the printer head creating the filament comprising 3D printable material. Hence, in embodiments the invention provides a fused deposition modeling 3D printer, comprising (a) a printer head comprising a printer nozzle, and (b) a filament providing device configured to provide a filament comprising 3D printable material to the printer head, wherein the fused deposition modeling 3D printer is configured to provide said 3D printable material to a substrate, further comprises (c) a fiber optics modifier as indicated above.

In an aspect, the invention provides a method comprising 3D printing a 3D item, the method comprising depositing during a printing stage 3D printable material and an optical fiber, to provide the 3D item with the optical fiber at least partly embedded in 3D printed material, the method further comprising providing during the printing stage a light escape part where visible light propagating through the optical fiber can escape from the optical fiber to external of the 3D item. The light escape part may comprise e.g. one or more of a specific bending radius that facilitates outcoupling of light from the optical fiber and/or an(other) outcoupling feature that facilitates outcoupling light escape from the optical fibers, such as a defect in the optical fiber (in embodiments including a cladding). The specific bending radius condition may in fact also provide a light outcoupling feature. Light may escape directly to the external when the optical fiber is not fully embedded and is over at least part of the length, comprising the outcoupling feature, directly in contact with the external. Hence, in embodiments the 3D printable material and 3D printed material may not comprise light transmissive material, as the optical fiber may not be fully embedded but may be at the surface of the 3D printed object and/or extends from such surface. In such embodiments, the light escape part may essentially be the part of the optical fiber where light escapes from the optical fiber direct to the external of the 3D printed item. Hence, one or more segments may not be fully covered with 3D printed material.

In yet other embodiments, the optical fiber is fully embedded over at least part of its length where the optical fiber also comprises the light outcoupling feature. In such instances the light escape part may further include light transmissive material (i.e. 3D printed material that comprises light transmissive material).

Hence, the invention also provides a method comprising 3D printing a 3D item, the method comprising depositing during a printing stage 3D printable material and an optical fiber, to provide the 3D item with the optical fiber at least partly embedded in 3D printed material, wherein the 3D printable material during at least part of the printing stage may comprise a light transmissive material or may comprise light non-transmissive material, the method further comprising providing during the printing stage a light escape part, wherein, when the light escape part comprises 3D printed material, the 3D printed material comprises light transmissive material, wherein the light escape part especially comprises a light outcoupling features, such as bending with a radius smaller than at maximum 20 times the diameter of the optical fiber and/or a part without cladding and/or a defect in the fiber (or fiber and cladding), by which visible light propagating through the optical fiber can escape from the optical fiber, optionally via the 3D printed material comprised by the light escape part, to external of the 3D item.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

Figure 1A:
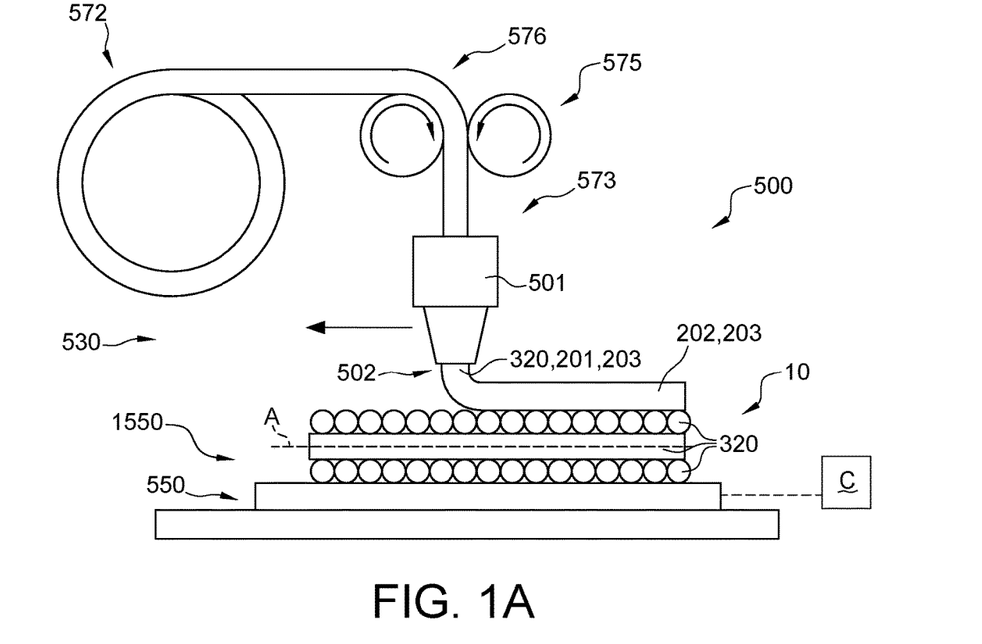
FIGS. 1a-1b schematically depict some general aspects of the 3D printer.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as a FDM 3D printer head is schematically depicted. Reference 501 indicates the printer head. The 3D printer of the present invention may especially include a plurality of printer heads, though other embodiments are also possible. Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below).

The 3D printer 500 is configured to generate a 3D item 10 by depositing on a receiver item 550, which may in embodiments at least temporarily be cooled, a plurality of filaments 320 wherein each filament 20 comprises 3D printable material, such as having a melting point $T_m$. The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire. The 3D printer 500 transforms this in a filament or fiber 320 on the receiver item or on already deposited printed material. In general, the diameter of the filament downstream of the nozzle is reduced relative to the diameter of the filament upstream of the printer head. Hence, the printer nozzle is sometimes (also) indicated as extruder nozzle. Arranging filament by filament and filament on filament, a 3D item 10 may be formed. Reference 575 indicates the filament providing device, which here amongst others include the spool or roller and the driver wheels, indicated with reference 576.

Reference A indicates a longitudinal axis or filament axis.

Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

Figure 1B:
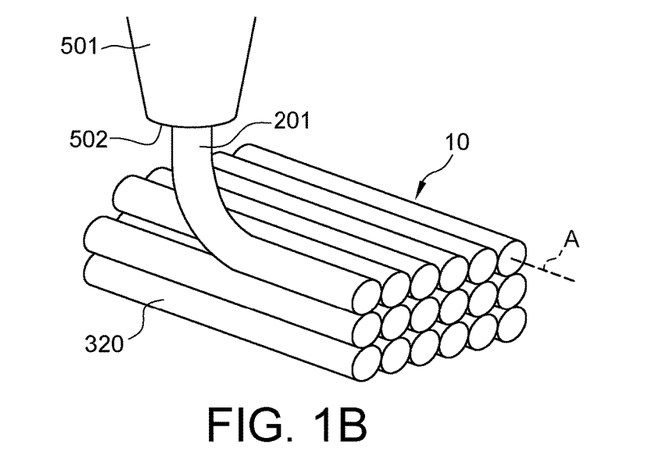

FIG. 1b schematically depicts in 3D in more detail the printing of the 3D item 10 under construction. Here, in this schematic drawing the ends of the filaments 320 in a single plane are not interconnected, though in reality this may in embodiments be the case.

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 320 comprising 3D printable material 201 to the first printer head 501, and optionally (c) a receiver item 550. In FIGS. 1a-1b, the first or second printable material or the first or second printed material are indicated with the general indications printable material 201 and printed material 202.

Figure 2A:
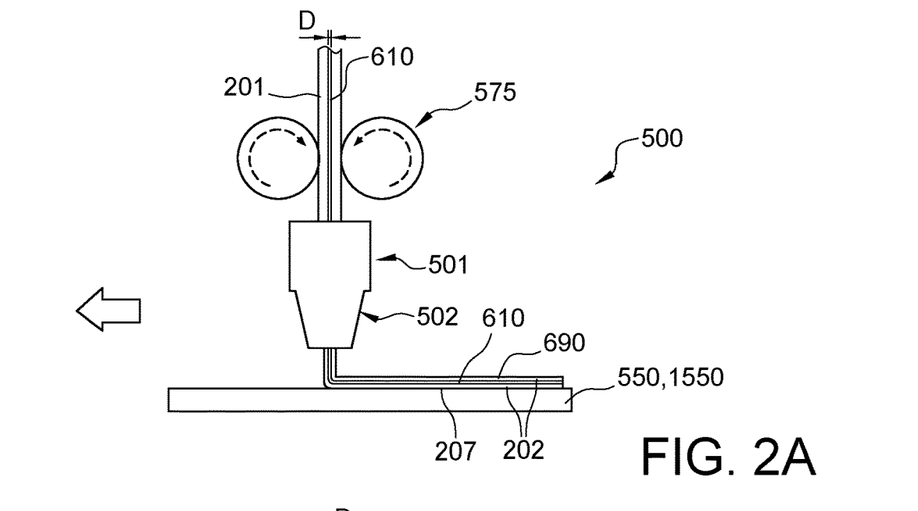
FIGS. 2a-2c schematically depict some possible 3D printer heads.
Figure 2B:
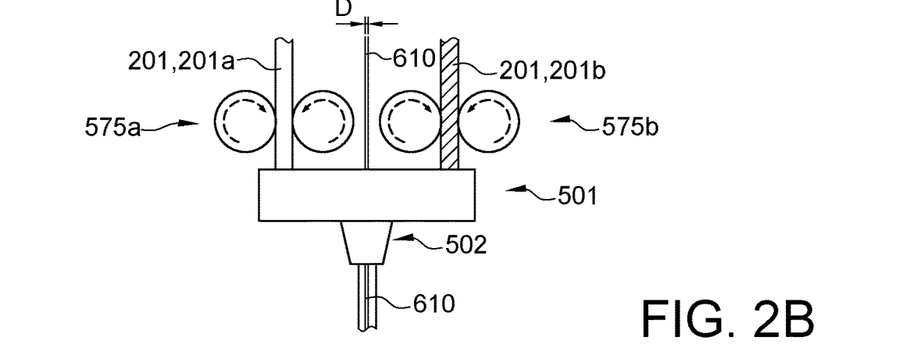
Figure 2C:
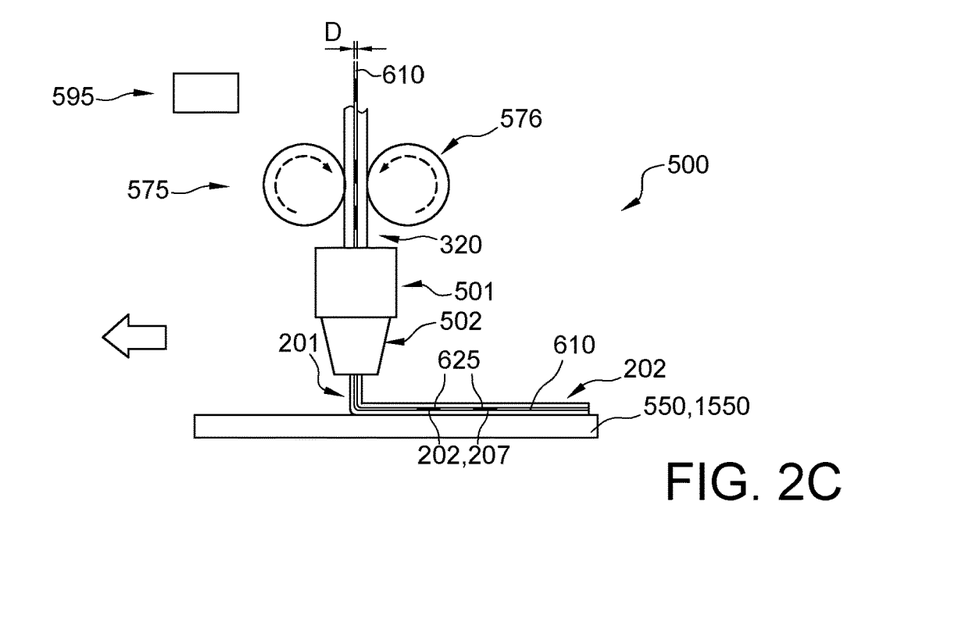

Amongst others, it is herein suggested to the use an optical fiber in combination with 3D printing for producing lighting luminaries, see e.g. FIGS. 2a-2c.

The fiber is included during 3D printing into a light transmissive host polymer which leads to the formation of 3D structures. FIG. 2a schematically depicts an embodiment of a fused deposition modeling 3D printer 500, comprising (a) a printer head 501 comprising a printer nozzle 502, and (b) a 3D printable material providing device 575 configured to provide 3D printable material 201 to the printer head 501. The fused deposition modeling 3D printer 500 is configured to provide said 3D printable material 201 and an optical fiber 610 to a substrate 1550. Note that the material downstream of the printer head 501 comprises an optical fiber comprising filament, with the optical fiber 610, having a diameter D, being embedded in the printable material 201. This leads to the production of the 3D item 1 with the comprising the optical fiber 610 embedded in the 3D printed material. Hence, FIG. 2*a* also schematically shows some aspects of a method comprising 3D printing a 3D item 1. The method may comprise depositing during a printing stage 3D printable material 201 and an optical fiber 610, wherein thus especially the 3D printable material 201 at least partly encloses the optical fiber 610. Hereby, the 3D item 1 with the optical fiber 610 at least partly embedded in 3D printed material 202 is provided. Further, the 3D printable material 201 during at least part of the printing stage comprises a light transmissive material 207. The method especially further includes providing during the printing stage a light escape part further discussed in more detail below comprising 3D printed material 202 comprising the light transmissive material 207, where visible light 11 propagating through the optical fiber 610 can escape from the optical fiber 610 via the 3D printed material 202 comprised by the light escape part 620 to external of the 3D item 1. In other embodiments, the optical fiber 610 may be deposited independent from the printer head 501, with another device for depositing the optical fiber 610, to provide the optical fiber 610 at least partly embedded in 3D printed material 202.

FIG. 2*b* schematically depicts an embodiment wherein the printer head 501 comprises two sources of printable material 201, especially two different types of printable material 201, indicated with reference 201*a* and 201*b*. The sources of printable material may again be filament providing devices 575, respectively, indicated with references 575*a* and 575*b*. Note that alternatively also other types of sources of printable material 201 may be used, as the filament 320 may also be created in the printer head 501 (and printer nozzle 502). With such printer head 501, it is (easily) possible to provide different types of printable material 201, in terms of polymer composition and/or (optional) additive types and/or (optional) additive concentration. The optical fiber 610 is also provided to the printer head 501. Hence, the printer may be used to provide more than one filament such as two filaments. One filament comprises the first section. Another filament comprises the second section. The printer may be used to provide a fiber. A controller (not depicted) may control the selection of the first filament and second filament.

A fiber with a cladding can be used and a computerized device can bring in defects into the fiber and/or the cladding during printing to the desired places of the printed object (such as schematically depicted in FIG. 2*c*).

FIG. 2*c* schematically depicts an embodiments of a fused deposition modelling 3D printer 500, further comprising (c) a fiber optics modifier 595 configured to modify the optical fiber 610 by one or more of (i) removing a part of a cladding and (ii) creating a defect in the optical fiber 610. Hence, with such printer 500, it is possible to execute a method wherein during the printing stage the light escape part 620 is provided by providing an outcoupling feature 625 to the optical fiber 610 for facilitating light escape from the optical fiber 610 via the outcoupling feature 625. Especially, providing an outcoupling feature 625 comprises one or more of (i) removing part of a cladding and (ii) creating a defect in the optical fiber. Defects may be created by a sharp element, such as a knife. Alternatively or additionally, defects may be created by a laser e.g. local heating of the core or cladding.

Herein, various strategies for producing customized light patterns in a 3D printed object are suggested. For example, a fiber with a cladding can be used and during printing sharp bends can be induced to adjust the amount as well as the direction of the light leaking out, see also FIG. 3*a*. Thus the 3D printed object or item 1 may comprise an optical fiber 610 comprises a core and a cladding.

Figure 3A:
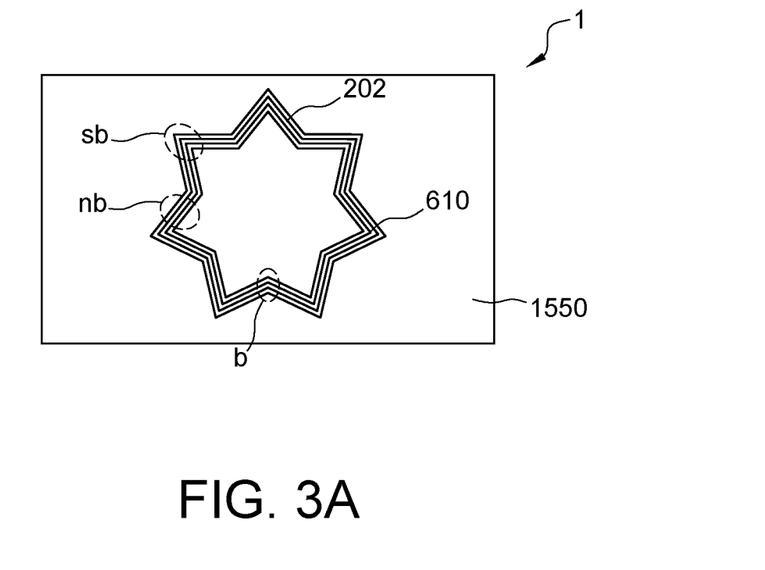
FIGS. 3a-3c schematically depict some embodiments.
Figure 3B:
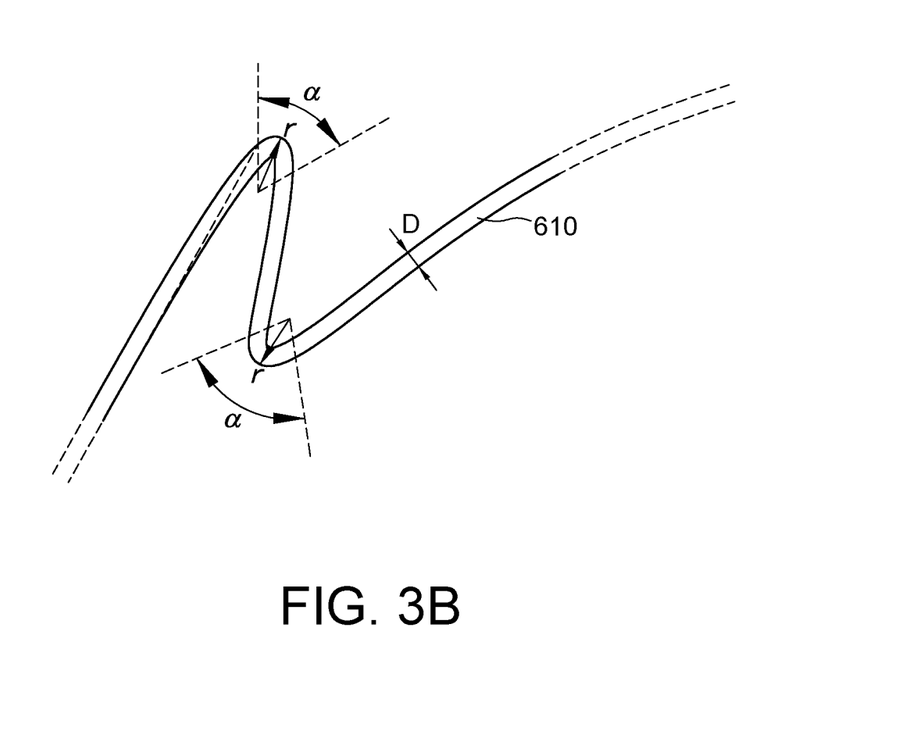

The optical fiber may comprises a first section with sharp bends, see reference sb, and a second section with no sharp bends, see reference also reference b, or with essentially no bend, see reference nb. The first sections, with sharp bends, provide light out coupling. The other sections may essentially not provide light outcoupling. By controlling the bend angle, the amount of light out coupling can be adapted. FIG. 3*b* schematically depicts in more detail bend angles α and concomitant radii r for such curved sections. Different bend angles and radii may provide different outcoupling intensities. Further, a 3D printed object is herein suggested, comprising an optical fiber comprises a core and a cladding. The optical fiber comprises a first section with a first sharp bend and a second section with a second sharp bend, wherein the first sharp bend and a second sharp bend differ in sharpness (see e.g. bends sb and b in FIG. 3*a*). As indicated above, the bending radius may be at maximum 20 times the diameter, such as at maximum 15 times the diameter of the optical fiber, like especially at maximum 10 times the diameter of the optical fiber, such as at maximum 5 times the diameter of the optical fiber. When the optical fiber comprises a cladding, the diameter is of the optical fiber including cladding.

It goes without saying that the 3D printed object comprises more than two sections with different bends or no bends.

Figure 3C:
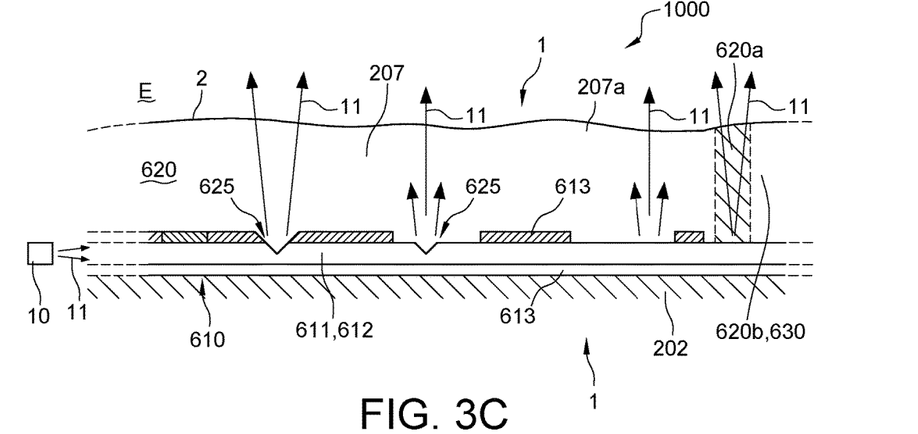

In an embodiment, defects 625 may be created through the cladding, indicated with reference 613, see FIG. 3*c*, or in the core, indicated with reference 612. FIG. 3*c* schematically depicts a number of variants in the same drawing. Light 11 may escape at these defects. Further, light may escape from the core when no cladding 613 is available, and e.g. light transmissive material 207 is applied having an index of refraction that is higher than of the core 612. Such material is indicated with reference 207*b*. In another example, we suggest 3D printing of a fiber without a cladding using multiple polymer filaments can be used for tuning the amount of light out-coupling. FIG. 3*c* also schematically depicts an embodiment wherein the 3D printed material comprises a light escape part 620*a* which comprises an index of refraction larger than of the optical fiber (without cladding). In this way, also light may escape. Reference 620*b* indicates a material that may be light transmissive per se, but due to addition of scattering particles (not depicted), the material is essentially light impermeable. Hence, light may not escape to the external. Hence, part 630 may be light transmissive as the polymer may be essentially light impermeable and/or due to addition of e.g. scattering particles, or light absorbing particles, etc.

When a fiber without a cladding is used, it is possible to use different 3D printable (or printed) materials, such as one material with a refractive index lower than that of the optical fiber so that especially wave guiding in the optical fiber takes place, and another material having a refractive index similar or higher than that of the fiber to couple light out. Hence, at some places light may be kept in the fiber and at other places, light may escape from the fiber.

Further during printing it is possible not to apply polymer onto the fiber during printing. Thus sections of the printed object does not have any polymer on the fiber. Reference 611 refers to a glass material as core material. Glass is a suitable material for the core, though optionally also polymeric material may be used, or quartz, etc. FIG. 3*c* also schematically depicts a lighting system 1000 comprising (a) a light source 10 configured to provide visible light source light 11 and (b) the 3D item 1 according to any one of the preceding claims, wherein the optical fiber 610 is functionally coupled to the light source 10.

Further, printable material with different compositions may be applied. This may lead to different transparencies, different optical effects in the sense of scattering and/or luminescence, etc. etc. For instance, the position of first host polymer and a second host polymer can be adapted wherein the first host polymer and a second host polymer differ in refractive index amount of phosphor (luminescent material) and/or scattering material. Here, the term "host polymer" refers to printable material or printed material, wherein the optical fiber is embedded. Hence, the 3D printable material or 3D printed material hosts (at least part of) the optical fiber. With tuning the properties of the 3D printable material, during the 3D printing process local customized light outcoupling/conversion sections can be obtained.

Figure 4:
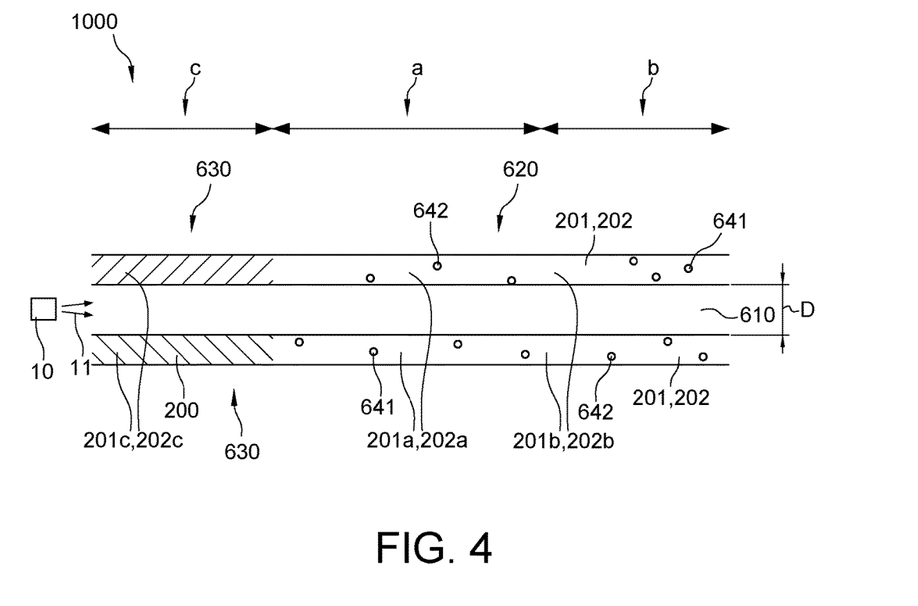
FIG. 4 schematically depicts some further embodiments.

FIG. 4 schematically depicts an embodiment wherein different sections or parts (indicated with a, b and c) are created. Again, only for example purposes three different variants are depicted in a single drawing. 12. For instance, the 3D item 1 may comprise one or more light escape parts 620 and one or more other parts 630 that are not light transmissive. Further, two or more parts 620,630 may differ in one or more of (i) a concentration of light reflective particles 641 comprised by the 3D printed material 202, (ii) a concentration of luminescent material 642 comprised by the 3D printed material 202, (iii) an index of refraction of the 3D printed material 202, and (iv) a composition of the polymeric material comprised by the 3D printed material 202. Hence, the 3D item 1 may e.g. comprise one or more light escape parts 620 and one or more parts 630 that are not light transmissive and where no visible light can escape to the external via the 3D printed material 202. FIG. 4 may depicted printed material 202 but may in fact also show filaments of 3D printable material 201. Hence, references 201,202 are used, to show that this drawing may be used to depicted either filaments before deposition (3D printable material), but also filaments after deposition (3D printed material 202). Reference 208 indicates a second material having a second transmission, which is essentially lower than the transmission of the light transmissive material 207.

Herein, amongst others a 3D printer, a computer program and a 3D printing method are suggested. Further, a computer program is suggested, which can be used for a method including loading a 3D design to be printed, calculating the light out coupling positions for a specific lighting effect, and printing the 3D item. Also a method of 3D printing is suggested, the method comprising loading a 3D design to be printed, calculating the light out coupling positions for a specific lighting effect, making the light out coupling sections in the fiber, 3D printing of structure.

In an example, a glass fiber with a cladding was used and printed together with a transparent polycarbonate to provide a tubular 3D printed item. Blue light from a laser was used to couple light into the fiber. Outcoupling structures were provided in the fiber by providing imperfections in the core.

The term "substantially" herein, such as "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention claimed is:

1. A method comprising 3D printing a 3D item, the method comprising
   depositing during a printing stage 3D printable material and an optical fiber, to provide the 3D item with the optical fiber at least partly embedded in 3D printed material,
   wherein the 3D printable material during at least part of the printing stage comprises a light transmissive material, the method further comprising providing during the printing stage a light escape part comprising 3D printed material comprising the light transmissive material, where visible light propagating through the optical fiber can escape from the optical fiber via the 3D printed material comprised by the light escape part to external of the 3D item, and wherein during the printing stage the light escape part is further provided by providing an outcoupling feature to the optical fiber for facilitating light escape from the optical fiber via the outcoupling feature.

2. The method according to claim 1, wherein during the printing stage the light escape part is further provided by configuring the optical fiber with a bending radius that facilitates light escape from the optical fiber.

3. The method according to claim 1, wherein providing an outcoupling feature comprises one or more of removing part of a cladding and creating a defect in the optical fiber.

4. The method according to claim 1, wherein the light transmissive material comprised by the light escape part has an index of refraction higher than an index of refraction of the optical fiber.

5. The method according to claim 1, further comprising changing the composition of the 3D printable material during the printing stage by changing one or more of a concentration of light reflective particles comprised by the 3D printable material, a concentration of a luminescent material comprised by the 3D printable material, an index of refraction of the 3D printable material, and a composition of the polymeric material comprised by the 3D printable material, for providing different parts of the 3D item, with at least the light escape part.

6. The method according to claim 1, wherein the optical fiber comprises a glass material, and wherein the method comprises a fused deposition modeling method, wherein during the printing stage the optical fiber and the 3D printable material are simultaneously deposited with a single printer head.

7. The method according to claim 1, wherein the light transmissive material has a first transmission, wherein during a part of the printing stage the 3D printable material comprises a second material having a second transmission lower than the first transmission, and wherein the method further comprises providing one or more light escape parts and one or more parts that are not light transmissive and where no visible light can escape to the external via the 3D printed material, wherein the one or more parts comprise the second material.

8. A lighting system comprising a light source configured to provide visible light source light and the 3D item according to claim 1, wherein the optical fiber is functionally coupled to the light source.

9. A 3D item comprising 3D printed material and an optical fiber, wherein the optical fiber is at least partly embedded in the 3D printed material, wherein the 3D item comprises a light escape part comprising the 3D printed material comprising a light transmissive material having a first transmission, where visible light propagating through the optical fiber can escape from the optical fiber via the 3D printed material comprised by the light escape part to external of the 3D item, and wherein the optical fiber within the light escape part has an outcoupling feature for facilitating light escape from the optical fiber via the outcoupling feature.

10. The 3D item according to claim 9, wherein one or more of the optical fiber within the light escape part has a bending radius that facilitates light escape from the optical fiber, and the light transmissive material comprised by the light escape part has an index of refraction higher than an index of refraction of the optical fiber.

11. The 3D item according to claim 9, wherein one or more of the optical fiber comprises a core comprising a glass material and a cladding, wherein at least part of the core is not covered by the cladding wherein the part is at least partly comprised by the light escape part, and the optical fiber comprises an outcoupling feature comprising a defect for facilitating outcoupling of visible light from the optical fiber, wherein at least part of the outcoupling feature is comprised by the light escape part.

12. The 3D item according to claim 9, comprising one or more light escape parts and one or more other parts that are not light transmissive, wherein two or more parts differ in one or more of a concentration of light reflective particles comprised by the 3D printed material, a concentration of a luminescent material comprised by the 3D printed material, an index of refraction of the 3D printed material, and a composition of the polymeric material comprised by the 3D printed material.

13. The 3D item according to claim 9, comprising one or more light escape parts, and one or more parts that are not light transmissive and where no visible light can escape to the external via the 3D printed material, and wherein the optical fiber within the light escape part has a bending radius of at maximum 20 times a diameter of the optical fiber.

14. A fused deposition modeling 3D printer, comprising a printer head comprising a printer nozzle, and a 3D printable material providing device configured to provide 3D printable material to the printer head, wherein the fused deposition modeling 3D printer is configured to provide said 3D printable material and an optical fiber to a substrate, and wherein the fused deposition modeling 3D printer further comprises a fiber optics modifier configured to modify the optical fiber by one or more of removing a part of a cladding and creating a defect in the optical fiber.

* * * * *